(12) United States Patent
Lee et al.

(10) Patent No.: US 9,577,862 B2
(45) Date of Patent: *Feb. 21, 2017

(54) METHOD FOR PERFORMING AN ADAPTIVE MODULATION AND CODING SCHEME IN MOBILE COMMUNICATION SYSTEM

(71) Applicant: LG ELECTRONICS INC., Seoul (KR)

(72) Inventors: Moon Il Lee, Anyang-si (KR); Bin Chul Ihm, Anyang-si (KR); Jin Young Chun, Anyang-si (KR); Sung Ho Park, Anyang-si (KR); Hyun Soo Ko, Anyang-si (KR); Wook Bong Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 266 days.

This patent is subject to a terminal disclaimer.

(21) Appl. No.: 14/444,619

(22) Filed: Jul. 28, 2014

(65) Prior Publication Data

US 2014/0334425 A1 Nov. 13, 2014

Related U.S. Application Data

(63) Continuation of application No. 13/838,545, filed on Mar. 15, 2013, now Pat. No. 8,830,967, which is a
(Continued)

(30) Foreign Application Priority Data

Jun. 1, 2007 (KR) .................. 10-2007-0054088
Feb. 21, 2008 (KR) .................. 10-2008-0016021

(51) Int. Cl.
| | |
|---|---|
| *H04B 7/216* | (2006.01) |
| *H04L 27/26* | (2006.01) |
| *H04L 25/02* | (2006.01) |
| *H04W 72/04* | (2009.01) |
| *H04B 1/16* | (2006.01) |
| *H04L 5/00* | (2006.01) |

(Continued)

(52) U.S. Cl.
CPC ............ *H04L 27/2647* (2013.01); *H04B 1/16* (2013.01); *H04L 1/0017* (2013.01);
(Continued)

(58) Field of Classification Search
None
See application file for complete search history.

(56) References Cited

U.S. PATENT DOCUMENTS 7,126,996 B2   10/2006   Classon et al.
7,751,493 B2   7/2010    Niu et al.
(Continued)

FOREIGN PATENT DOCUMENTS

EP   1289181   3/2003
EP   1424869   6/2004
(Continued)

*Primary Examiner* — Kenny Lin
(74) *Attorney, Agent, or Firm* — Lee Hong Degerman Kang & Waimey

(57) ABSTRACT

A method for performing an adaptive modulation and coding scheme in a mobile communication system. Including receiving a signal and selecting a modulation and coding scheme (MCS) level from an MCS subset of an MCS set considering information derived from the signal, by a mobile station. The MCS subset is selected in accordance with a service type related to the mobile station and the MCS subset is configured with one or more MCS levels, the MCS set is represented by 5 bits and the MCS subset is represented by 4 bits to indicate MCS value, respectively, and the 4 bits of the MCS subset is a part of the 5 bits of the MCS set.

14 Claims, 1 Drawing Sheet

Related U.S. Application Data continuation of application No. 12/528,419, filed as application No. PCT/KR2008/001424 on Mar. 13, 2008, now Pat. No. 8,446,882.

(60) Provisional application No. 60/894,606, filed on Mar. 13, 2007, provisional application No. 60/983,227, filed on Oct. 29, 2007.

(51) Int. Cl.
*H04L 12/18* (2006.01)
*H04L 1/00* (2006.01)

(52) U.S. Cl.
CPC .......... *H04L 1/0029* (2013.01); *H04L 5/0058* (2013.01); *H04L 12/18* (2013.01); *H04L 25/0202* (2013.01); *H04L 27/2601* (2013.01); *H04W 72/0406* (2013.01); *H04L 1/0003* (2013.01); *H04L 1/0009* (2013.01); *H04L 1/0073* (2013.01)

(56) References Cited

U.S. PATENT DOCUMENTS

| | | |
|---|---|---|
| 2004/0002364 A1 | 1/2004 | Trikkonen et al. |
| 2004/0196801 A1 | 10/2004 | Hiramatsu |
| 2006/0153060 A1* | 7/2006 | Cho ............ H04B 7/0619 370/208 |
| 2007/0066242 A1 | 3/2007 | Yi et al. |
| 2007/0155338 A1 | 7/2007 | Hong et al. |
| 2007/0183529 A1 | 8/2007 | Tujkovic et al. |
| 2007/0254603 A1 | 11/2007 | Li et al. |
| 2008/0086662 A1 | 4/2008 | Li et al. |
| 2008/0089278 A1 | 4/2008 | Chang et al. |
| 2010/0014500 A1 | 1/2010 | Lee et al. |
| 2010/0061345 A1* | 3/2010 | Wengerter ....... H04L 1/0017 370/335 |

FOREIGN PATENT DOCUMENTS

| | | |
|---|---|---|
| EP | 1447933 | 8/2004 |
| EP | 1739907 | 1/2007 |
| EP | 1806860 | 7/2007 |
| JP | 2004120051 | 4/2004 |
| JP | 2006238314 | 9/2006 |
| JP | 2007020958 | 2/2007 |
| JP | 2007058178 | 3/2007 |
| JP | 2007325115 | 12/2007 |
| KR | 10-2003-0020158 | 3/2003 |
| KR | 10-2004-0008228 | 1/2004 |
| WO | 2006/059565 | 6/2006 |
| WO | 2007020994 | 2/2007 |

\* cited by examiner

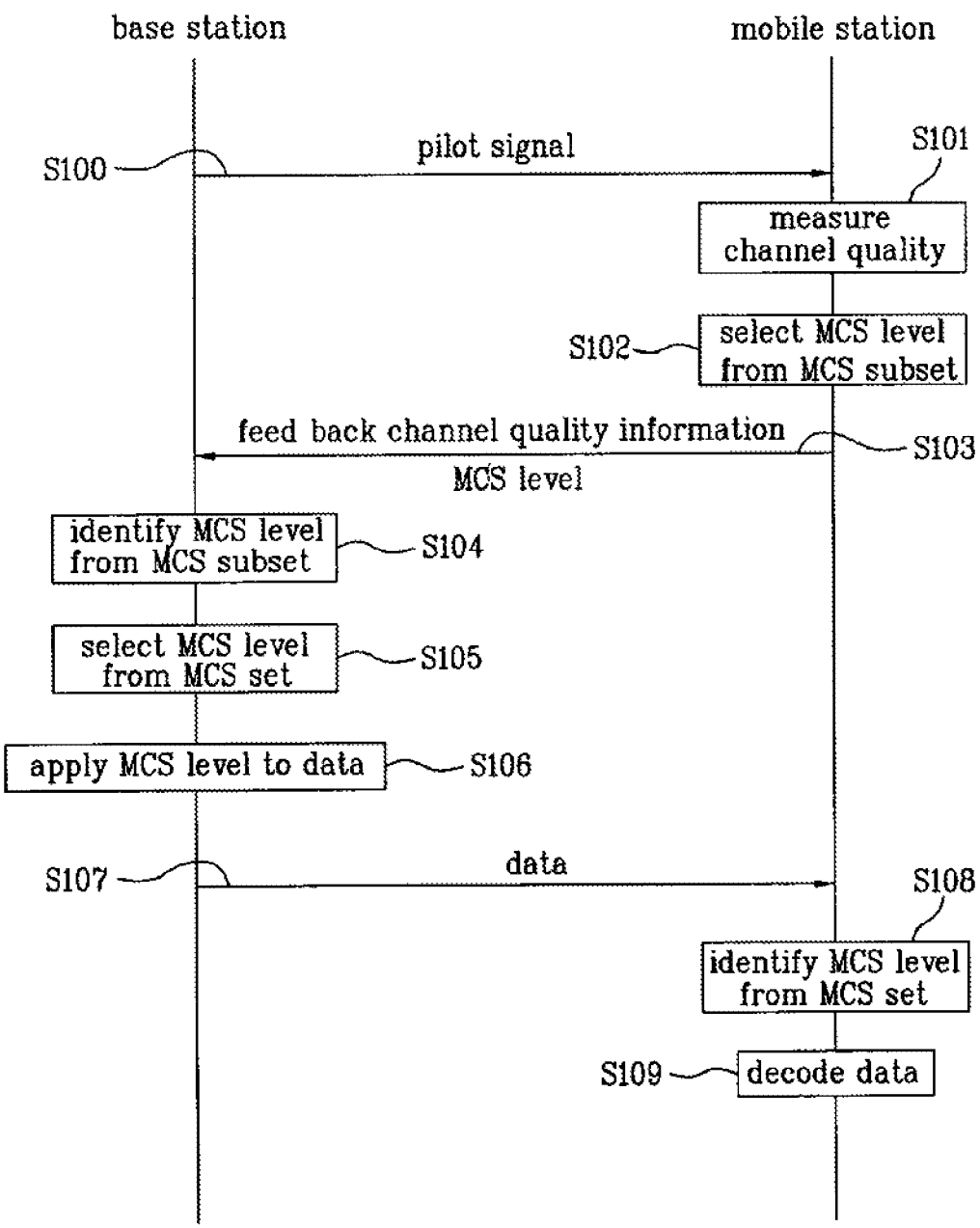

METHOD FOR PERFORMING AN ADAPTIVE MODULATION AND CODING SCHEME IN MOBILE COMMUNICATION SYSTEM

CROSS-REFERENCE TO RELATED APPLICATIONS

This application is a continuation of U.S. patent application Ser. No. 13/838,545, filed on Mar. 15, 2013, now U.S. Pat. No. 8,830,967, which is a continuation of U.S. patent application Ser. No. 12/528,419, filed on Aug. 24, 2009, now U.S. Pat. No. 8,446,882, which is the National Stage filing under 35 U.S.C. §371 of International Application No. PCT/KR2008/001424, filed on Mar. 13, 2008, which claims the benefit of earlier filing date and right of priority to Korean Application Nos. 10-2008-0016021, filed Feb. 21, 2008, and 10-2007-0054088, filed Jun. 1, 2007, and also claims the benefit of U.S. Provisional Application No. 60/983,227, filed Oct. 29, 2007, and 60/894,606, filed Mar. 13, 2007, the contents of which are all hereby incorporated by reference herein in their entirety.

TECHNICAL FIELD

The present invention relates to a mobile communication system, and more particularly, to a method for performing an adaptive modulation and coding scheme in a mobile communication system.

BACKGROUND ART

Unlike a voice communication based service type, a high-speed multimedia data communication service is characterized in that data packets are not constantly arrived from a receiver but intermittently transmitted. Therefore, there may be a case where a lot of packets are suddenly arrived from the receiver. In order to provide a packet service to a plurality of users, resources such as time, symbol and power should commonly be used among the users.

Since a channel condition between a packet and its subsequent packet is varied, it is difficult to equally apply the existing power control to such a variable channel condition. Also, since the high-speed multimedia data communication service allows data, which are relatively more than those of the existing voice communication service type, to be transmitted and received during a transmission and reception interval, an advanced modulation scheme, various diversity schemes and error correction coding schemes are used. Among them, the existing link adaptation scheme for coping with channel condition variation between data packets will be described.

If channels of uplink/downlink are divided into a frequency domain, the channels are different from each other. Accordingly, a general link adaptation scheme is to apply a transmission and reception scheme most suitable for channel information by exchanging the channel information between a transmitter and a receiver. Representative examples of the existing link adaptation scheme include an adaptive modulation and coding (AMC) scheme and a power control scheme.

The power control scheme is to maintain transmission quality by controlling the power in accordance with a radio link, thereby ensuring quality of a link under a fixed transmission rate status such as the voice communication service. On the other hand, since a multimedia data service requires various transmission rates, various transmission qualities, and so on depending on service type, a link adaptation scheme which is different from that used in the existing voice based service is required. Since the AMC scheme is the link adaptation scheme efficient for multimedia data transmission, the AMC scheme is to vary a transmission rate (not transmission power) to be suitable for a channel environment. In case of the power control, the transmission power is varied depending on channel to obtain a fixed signal-to-Noise ratio (SNR) or signal-to-Interference ratio (SIR).

On the other hand, since AMC scheme determines a proper transmission rate depending on channel characteristics, the transmission power is basically fixed. The transmission rate is determined by MCS level, which relates to previously defined modulation and channel coding combination. The MCS level is determined depending on receiving SNR. The MCS level which satisfies a target frame error rate and has the highest efficiency is selected depending on the SNR. In order to support the AMC, a mobile station should know information of receiving SNR and forward channel quality information to a base station.

For example, a high speed downlink packet access (hereinafter, referred to as "HSDPA") which is a wideband code division multiple access (WCDNA) wireless packet service uses a high speed dedicated physical control channel (hereinafter, referred to as "HS-DPCCH"), so that each user equipment can select a base station having the most excellent channel status to feed back modulation and coding information suitable for the corresponding channel, wherein the AMC scheme is applied to the WCMA wireless packet service. A channel quality information (hereinafter, referred to as "CQI") bit is allocated to the HS-DPCCH. The CQI bit is information fed back from a receiver to indicate the channel status. The CQI bit may represent the MCS level or may simply represent an appropriate SNR. Accordingly, the number of MCS levels, which is used by the transmitter and the receiver, may be varied depending on the information quantity of the CQI bit.

For example, in case of using MCS set as illustrated in Table 1 below, minimum 5 bits or greater are required for MCS set of all cases. In this case, the MCS set have a total of 32 MCS levels, and each combination of modulation and coding schemes from 0 to 31 is expressed by a decimal number, and is referred to as MCS index or CQI index.

For example, If CQI bit, which is fed back, is 01000, it represents MCS level having MCS index of 8 among the MCS set having a total of 32 MCS levels. This means that the base station transmits data to a mobile station by selecting a coding rate of 7/8 and a QPSK modulation scheme depending on the above feedback information. In other words, the system selects MCS level suitable for the channel status among the previously set MCS set, by using either channel information fed back from the receiver, or MCS index information (for example, CQI).

TABLE 1

| (CQI index) | Coding Rate | Modulation |
| --- | --- | --- |
| 0 (00000) | 1/5 | QPSK |
| 1 (00001) | 1/4 | QPSK |
| 2 (00010) | 1/3 | QPSK |
| 3 (00011) | 1/2 | QPSK |
| 4 (00100) | 3/5 | QPSK |
| 5 (00101) | 2/3 | QPSK |
| 6 (00110) | 3/4 | QPSK |
| 7 (00111) | 4/5 | QPSK |
| 8 (01000) | 7/8 | QPSK |

TABLE 1-continued

| (CQI index) | Coding Rate | Modulation |
|---|---|---|
| 9 (01001) | 1/2 | 16-QAM |
| 10 (01010) | 3/5 | 16-QAM |
| 11 (01011) | 2/3 | 16-QAM |
| 12 (01100) | 3/4 | 16-QAM |
| 13 (01101) | 4/5 | 16-QAM |
| 14 (01110) | 5/6 | 16-QAM |
| 15 (01111) | 7/8 | 16-QAM |
| 16 (10000) | 8/9 | 16-QAM |
| 17 (10001) | 9/10 | 16-QAM |
| 18 (10010) | 10/11 | 16-QAM |
| 19 (10011) | 11/12 | 16-QAM |
| 20 (10100) | 1/2 | 64-QAM |
| 21 (10101) | 3/5 | 64-QAM |
| 22 (10110) | 2/3 | 64-QAM |
| 23 (10111) | 3/4 | 64-QAM |
| 24 (11000) | 4/5 | 64-QAM |
| 25 (11001) | 5/6 | 64-QAM |
| 26 (11010) | 7/8 | 64-QAM |
| 27 (11011) | 8/9 | 64-QAM |
| 28 (11100) | 9/10 | 64-QAM |
| 29 (11101) | 10/11 | 64-QAM |
| 30 (11110) | 11/12 | 64-QAM |
| 31 (11111) | 1 | 64-QAM |

Generally, CQI information for sharing channel information between the base station and the mobile station is mainly used for a frequency division duplexing (hereinafter, referred to as "FDD") system which has different channels between an uplink and a downlink. The CQI which is fed back is used for determination of the MCS level and scheduling of the base station. The channel information or the MCS level index information may be fed back at a constant time period, or may be fed back when there is a request of the mobile station. The channel information or the MCS index information is transmitted using an error correction code (hereinafter, referred to as "ECC") to enhance reliability. The transmitter notifies the receiver of the selected MCS level through the downlink by considering feedback of the receiver.

An orthogonal frequency division multiplexing (hereinafter, referred to as "OFDM") system can have different channels depending on a frequency band, and can apply different MCSs depending on the frequency band. Therefore, the OFDM system uses a link adaptation scheme by feeding back channel information at a constant frequency band unit.

Also, since a system which uses a multiple input multiple output (MIMO) scheme can apply different MCS levels to each signal which is spatially transmitted, the system may feed back channel information spatially. The existing AMC scheme uses adaptive MCS level depending on the channel status. Namely, the existing AMC scheme uses the adaptive MCS level by fixing one MCS set between the system and the mobile station. Accordingly, channel information of the same quantity is always fed back, and the transmitter notifies the selected MCS level through the downlink.

Therefore, in case that a channel is slowly varied due to slow moving speed of the mobile station and the MCS level which sufficiently considers the channel status through the AMC can be used, MCS set having small MCS granularity can use a proper MCS level per receiving SNR, and higher system performance can be obtained. Also, a closed-loop multiple antenna scheme such as beam-forming and precoding, which is suitable for the higher system performance, can be used.

However, in case that a channel is fast varied due to fast moving speed of the mobile station, or in an open-loop system such as diversity scheme which does not require feedback information except for CQI information, since it is likely that channel information measured during reception is greatly varied, if MCS granularity is small, the system may fail to transmit data at a required transmission rate within a fast time. In this respect, the MCS granularity should be greater than 1 dB interval.

Furthermore, the high speed wireless data service requires fast data processing in view of its characteristics as described above. For example, in high speed data packet access (HSDPA) of the WCDMA, a part which manages and controls the AMC and hybrid automatic repeat request (hereinafter, referred to as "HARQ") should be located close to a wireless interface, thereby efficiently operating the AMC and the HARQ. In the existing voice based communication, since a part which is in charge of scheduling of data is located in a radio network controller (RNC), latency in processing time occurs.

For this reason, methods for properly coping with variation of the channel environment and enhancing efficiency are required. Also, in order to reduce complexity of the system due to high speed data, it is necessary to reduce feedback overhead of the mobile station. This is likewise applied to multicast traffic.

DISCLOSURE

Technical Problem

Accordingly, the present invention is directed to a method for performing an adaptive modulation and coding scheme in a mobile communication system, which substantially obviates one or more problems due to limitations and disadvantages of the related art. An object of the present invention is to provide a method for performing an adaptive modulation and coding scheme more efficiently in a mobile communication system.

Technical Solution

To achieve these objects and other advantages and in accordance with the purpose of the invention, as embodied and broadly described herein, a method for performing an adaptive modulation and coding (AMC) scheme in a mobile communication system comprises at a mobile station, measuring a channel status through a pilot signal from a base station, selecting a first modulation and coding selection (MCS) level among a predetermined number of MCS levels in a MCS subset, by considering the measured channel status and transmitting the first MCS level to the base station.

The MCS levels in the MCS subset may be included in a MCS set which is predetermined.

The method mat further include receiving data to which a second MCS level is applied and which is selected from the MCS set, from the base station by considering the first MCS level and decoding the data by using the second MCS level which is identified from the MCS set.

Also, the MCS subset may be used together with a power control factor.

Meanwhile, MCS granularity of the MCS subset may be greater than MCS granularity of a MCS set.

Also, the MCS levels in the MCS subset may be MCS levels having a specific coding scheme and/or a specific coding rate among MCS levels in a MCS set.

Also, the MCS subset may be adaptively selected from one or more MCS subset in accordance with a channel status and/or allocated resource status.

At this time, the one or more MCS subset may be configured by considering a service type related to the mobile station or a type of a mobile station which performs communication with the base station.

Also, at least part of uplink feedback information bits allocated based on MCS set may be used when transmitting the first MCS level.

In another aspect of the present invention, a method for performing an adaptive modulation and coding (AMC) scheme in a mobile communication system comprises at a base station, receiving a first modulation coding selection (MCS) level selected among a predetermined number of MCS levels in a MCS subset from a mobile station selecting a second MCS level among a predetermined number of MCS levels in a MCS set by considering the first MCS level processing data according to the second MCS level and transmitting the data to the mobile station.

The MCS levels in the MCS subset may be included in a MCS set which is predetermined.

The MCS subset may be used together with a power control factor.

Meanwhile, Signal to Noise Ratio (SNR) granularity of the MCS subset may be greater than SNR granularity of a MCS set.

Also, the MCS levels in the MCS subset may be MCS levels having a specific coding scheme and/or a specific coding rate among MCS levels in a MCS set.

Also, the MCS subset may be adaptively selected from one or more MCS subset in accordance with a channel status and/or allocated resource status.

At this time, the one or more MCS subset may be configured by considering a service type related to the mobile station or a type of a mobile station which performs communication with the base station.

Also, at least part of uplink feedback information bits allocated based on MCS set may be used when transmitting the first MCS level.

It is to be understood that both the foregoing general description and the following detailed description of the present invention are exemplary and explanatory and are intended to provide further explanation of the invention as claimed.

Advantageous Effects

A method for using MCS subset in a mobile communication according to the present invention has the following advantages.

First, since the quantity of information which is fed back to the system becomes small, it is possible to reduce complexity when a plurality of user access the system.

Second, in case that one system has several MCS sets including MCS subsets, it is possible to obtain optimized performance while reducing complexity of the system.

Third, it is possible to more adaptively cope with channel variation by applying MCS subset suitable for moving speed of a mobile station and user service type.

Finally, it is possible to more adaptively cope with channel variation according to moving speed of the mobile station and user service type by using MCS subset in the AMC scheme in conjunction with power control.

DESCRIPTION OF DRAWINGS

The accompanying drawings, which are included to provide a further understanding of the invention, illustrate embodiments of the invention and together with the description serve to explain the principle of the invention.

In the drawings:

FIG. 1 is a flow chart illustrating a method of applying AMC scheme by using MCS subset according to one embodiment of the present invention.

BEST MODE

Hereinafter, the preferred embodiments of the present invention will be described in detail referring to the accompanying drawings. It is intended that the detailed description which will be disclosed along with the accompanying drawings is to illustrate an exemplary embodiment of the present invention not a unique embodiment that can be carried out by the present invention.

The present invention is characterized in that MCS subset which includes a part of MCS set is used, wherein the MCS set is defined to apply an adaptive modulation and coding (AMC) scheme between a base station and a mobile station. At this time, the MCS subset may be used by being defined using a part of one or more MCS set.

According to the present invention, the base station or the mobile station can apply the AMC scheme by using the MCS set and/or the MCS subset. For example, after measuring a channel status through a signal, for example, a pilot signal, transmitted from the base station, a proper MCS level is selected from the MCS set and/or the MCS subset, so that the selected MCS level can be fed back to the base station as channel quality information. The base station identifies feedback information by using the MCS set and/or the MCS subset from the mobile station, and can use the identified result to data transmission.

Particularly, considering that feedback overhead of the mobile station is reduced, thereby reducing complexity of the system due to high-speed data, it is preferable that the mobile station transmits channel information by using the MCS subset which requires the number of feedback information bits smaller than that of the MCS set.

If the mobile station feeds back MCS level as channel status information by using the MCS subset, the base station can identify the received channel status information through the MCS subset. Also, the base station can process transmitting data according to at least one of a modulation scheme and a coding scheme of the MCS level selected in the MCS subset. Or the base station can process the transmitting data according to at least one of a modulation scheme and a coding scheme of MCS level selected in the MCS set considering the received channel status information (eg MCS level).

Furthermore, the base station can notify the fact that the mobile station feeds back the MCS level by using the MCS subset, through a separate uplink signal. Alternatively, the system may previously set that the mobile station feeds back the MCS level by using the MCS subset.

FIG. 1 is a flow chart illustrating a method of applying AMC scheme by using MCS subset according to one embodiment of the present invention.

According to the embodiment of the present invention, the mobile station receives a pilot signal from the base station in step S100, and measures channel status between the mobile station and the base station based on the received pilot signal in step S101. For example, channel quality can be identified in this step. In step S102, the mobile station can select MCS level from MCS set and/or MCS subset by using the measured channel status.

In step S103, the mobile station feeds back channel status information to the base station, wherein the channel status information can include the selected MCS level information as channel quality information. Particularly, FIG. 1 illustrates the case where the mobile station selects the MCS level from the MCS subset. As described above, it is preferable that the mobile station uses the MCS subset for uplink control information overhead gain.

In step S104, the base station identifies the MCS level selected by the mobile station from the MCS set and/or the MCS subset by using feedback information from the mobile station. In step S105, the base station can select the MCS level from the MCS set and/or the MCS subset by reflecting the MCS level selected by the mobile station, which is received through feedback.

Particularly, FIG. 1 illustrates the case where the base station selects the MCS level from the MCS set. In step S106, the base station applies the selected MCS level to data, and transmits the data to the mobile station in step S107. At this time, the base station may transmit MCS level information and information whether the MCS level is selected from the MCS set or the MCS subset to the mobile station.

If the base station transmits the data by using the MCS level selected from the MCS set, the mobile station can identify the MCS level applied to the data through the MCS set in step S108. Alternatively, if the base station transmits the data by using the MCS level selected from the MCS subset, the mobile station can identify the MCS level applied to the data through the MCS subset in step S108. And, the mobile station can decode the received data in accordance with the identified MCS level in step S109.

The base station uses the MCS set and the MCS subset together, wherein the MCS set are used for data transmission from the base station, and the MCS subset are used for reception when the base station identifies feedback information from the mobile station. This is because that control information from the mobile station, i.e., feedback overhead decrease is more required than that of the base station.

Hereinafter, various embodiments of the present invention will be described.

Embodiment 1

Adaptive Use of MCS Set and/or MCS Subset

In a method for performing an adaptive modulation and coding scheme in a mobile communication system in accordance with this embodiment, the base station may configure one or more MCS subset from one or more MCS set and set an available MCS subset among the configured one or more MCS subset, and may select a proper MCS set or a proper MCS subset in accordance with the channel status, the resource allocation status, or a receiver type of the mobile station and then and use the selected one for transmitting data.

Furthermore, the mobile station may also set an available MCS subset among the configured one or more MCS subset and may select a proper MCS set or a proper MCS subset in accordance with the channel status, the resource allocation status, or a receiver type of the mobile station and then use the selected one for feeding back.

Namely, the base station and the mobile station may adaptively use one or more MCS set and one or more MCS subset by selecting a desired MCS set or MCS subset among several configured MCS sets or several configured MCS subsets depending on various communication environments or various communication systems.

For example, in case of multicast traffic, it is preferable to use MCS subset having relatively small feedback overhead since there exists great feedback overhead from the system point of view. And, in case of unicast traffic, it is preferable to use MCS set having relatively large feedback overhead may be used since there exists small feedback overhead from the system point of view.

For another example, in case of the OFDM (Orthogonal Frequency Division Multiplexing) system, a frequency band is divided into parts of a constant size, and channel information is fed back to each of the divided parts. Also, the OFDM system may use different MCS level for each of users or divided frequency bands in consideration with a data mapping scheme of each of users or divided frequency bands. For example, in case of a localized mode in the OFDM system, MCS set may be used. And in case of a distributed mode in the OFDM system, MCS subset may be used. Therefore, CQI feedback overhead of a distributed mode at the receiver may be less than that of a localized mode.

Furthermore, in case of MIMO system including the OFDM system using MIMO scheme, there can exist a plurality of antenna or spatial channel and different MCS level can be user for each of the antenna or the spatial channel in consideration with the MIMO scheme. For example, the MCS set may be used for low-speed users or a closed-loop system which uses a MIMO scheme such as beam-forming scheme and precoding scheme wherein the schemes require feedback information. On the other hand, the MCS subset may be used for a high-speed users or open-loop system which uses a MIMO scheme such as diversity scheme wherein the scheme does not require feedback information perhaps excluding CQI.

In these cases, the systems may notify the mobile station of the MCS level per each of users, frequency channel parts, spatial channels or antennas wherein the MCS level is selected MCS set or MCS subset by the base station through a downlink by using channel information fed back from the mobile station to the base station.

Embodiment 2

Method for Configuring MCS Subset

The MCS subset according to the present invention can be configured by various methods. As described above, the MCS subset can be used by defining a part of one or more MCS set. According to the method for configuring MCS subset, MCS levels of MCS subset can be included in one or more MCS set.

Hereinafter, various embodiments of the method for configuring MCS subset will be described.

Embodiment 2-1

Method for Configuring MCS Subset According to Modulation Scheme

According to the method for configuring MCS subset in accordance with this embodiment, MCS subset can be set per modulation scheme. Namely, it MCS levels defining various modulation schemes are included in MCS set, MCS levels to which a modulation scheme is equally applied can be configured as one MCS subset. For example, according to whether modulation scheme is BPSK, QPSK, 8PSK, 8QAM, or 16QAM, the MCS subset can be set. Hereinafter, Table 2 illustrates an example of a method for configuring MCS subset in accordance with a modulation scheme in a 5 bit MCS set.

TABLE 2

| MCS set (CQI: 5 bits) | Coding rate | Modulation | MCS Subset (CQI: 4 bits) |
|---|---|---|---|
| 0 (00000) | 1/5 | QPSK | Subset 1 |
| 1 (00001) | 1/4 | QPSK | |
| 2 (00010) | 1/3 | QPSK | |
| 3 (00011) | 1/2 | QPSK | |
| 4 (00100) | 3/5 | QPSK | |
| 5 (00101) | 2/3 | QPSK | |
| 6 (00110) | 3/4 | QPSK | |
| 7 (00111) | 4/5 | QPSK | |
| 8 (01000) | 7/8 | QPSK | |
| 9 (01001) | 1/2 | 16-QAM | Subset 2 |
| 10 (01010) | 3/5 | 16-QAM | |
| 11 (01011) | 2/3 | 16-QAM | |
| 12 (01100) | 3/4 | 16-QAM | |
| 13 (01101) | 4/5 | 16-QAM | |
| 14 (01110) | 5/6 | 16-QAM | |
| 15 (01111) | 7/8 | 16-QAM | |
| 16 (10000) | 8/9 | 16-QAM | |
| 17 (10001) | 9/10 | 16-QAM | |
| 18 (10010) | 10/11 | 16-QAM | |
| 19 (10011) | 11/12 | 16-QAM | |
| 20 (10100) | 1/2 | 64-QAM | Subset 3 |
| 21 (10101) | 3/5 | 64-QAM | |
| 22 (10110) | 2/3 | 64-QAM | |
| 23 (10111) | 3/4 | 64-QAM | |
| 24 (11000) | 4/5 | 64-QAM | |
| 25 (11001) | 5/6 | 64-QAM | |
| 26 (11010) | 7/8 | 64-QAM | |
| 27 (11011) | 8/9 | 64-QAM | |
| 28 (11100) | 9/10 | 64-QAM | |
| 29 (11101) | 10/11 | 64-QAM | |
| 30 (11110) | 11/12 | 64-QAM | |
| 31 (11111) | 1 | 64-QAM | |

As illustrated in the MCS set of Table 2, QPSK, 16QAM, and 64QAM can be used for downlink data transmission. At this time, the MCS set can configure a MCS subset to include MCS level of a specific modulation scheme. For example, the MCS set can configure a MCS subset 3 to include MCS level of a specific modulation scheme of 64QAM. And then, the MCS subsets can selectively be used in accordance with a specific channel status, a service type, a type of the mobile station, and a downlink channel which is used.

Furthermore, a MCS subset can be configured to include the other MCS levels except for MCS levels defining a specific modulation scheme (for example, 64QAM) in the MCS set in accordance with a specific channel status, a service type, a type of the mobile station, and a downlink channel which is used.

In this case, the mobile station is not able to receive data modulated by the specific modulation scheme (for example, 64QAM) thereby it is possible to reduce complexity of the receiver. And, since channel estimation performance is not good in case of a specific channel status, the mobile station is not able to receive data modulated by a modulation scheme sensitive to channel estimation performance (for example, 16QAM or 64QAM) is not used, so as to enable robust data transmission and reception. Likewise, the MCS subset can be set by a coding scheme or a coding rate in an error correction coding scheme.

Embodiment 2-2

Method for Configuring MCS Subset Using SNR Granularity

According to the method for configuring MCS subset in accordance with this embodiment, MCS subset can be configured by using SNR granularity differently from the MCS set. In this case, the SNR granularity means a constant SNR interval if the MCS levels in the MCS set are defined at the constant SNR interval.

For example, if the MCS set are configured to have 32 MCS levels at an interval of 1 dB from −5 dB to 23 dB, all MCS levels of the MCS set can be determined by using feedback information of minimum 5 bits. At this time, the SNR granularity of the MCS set could be 1 dB. In case that SNR value or channel value generated using the SNR value is transmitted as channel quality information.

In the method for configuring MCS subset in accordance with this embodiment, when MCS set configured at an interval of k dB are used, MCS subset can be configured at an interval of 1 dB (1>k). Accordingly, the SNR granularity of the MCS set is 1 dB, the SNR granularity of the MCS subset could be used at a value not 1 dB, preferably a value of 1 greater than 1 dB.

In other words, if maximum number of MCS levels of the MCS set that can be used by the base station and the mobile station are used, the MCS granularity is 1 dB based on the maximum number of MCS levels. However, the MCS subset are determined to allow the base station or the mobile station to use some MCS levels instead of all MCS levels in the MCS set, whereby SNR granularity becomes greater than one level.

In view of transmission channel SNR, the SNR granularity becomes greater than reference granularity of 1 dB when next MCS level is selected. For example, although SNR has been transmitted at an interval of 1 dB from −5 dB to 23 dB in the aforementioned transmission SNR example, the SNR can be transmitted at an interval of 2 dB that is, the SNR granularity of the MCS subset may be 2 dB.

The method for configuring MCS subset by using the aforementioned SNR granularity can be implemented in such a manner that MCS levels having same one or more bit continued from the least significant bit in a bit expression of MCS level index are configured as a MCS subset.

Table 3 illustrates an example of a method for configuring MCS subset using SNR granularity in a 5 bits MCS set. The SNR granularity may be referred to as CQI granularity or MCS granularity. For example, in the table 3, the MCS granularity in the MCS set can be defined as 1 MCS level as a minimum granularity and the MCS granularity in MCS subset 1 can be defined as 2 MCS level.

TABLE 3

| MCS set (CQI: 5 bits) | Subset 1 (CQI: 4 bits) | Subset 2 (CQI: 3 bits) | Subset 3 (CQI: 2 bits) | Coding rate | Modulation |
|---|---|---|---|---|---|
| 0 (00000) | 0 (0000) | 0 (000) | 0 (00) | 1/5 | QPSK |
| 1 (00001) | | | | 1/4 | QPSK |
| 2 (00010) | 1 (0001<u>0</u>) | | | 1/3 | QPSK |
| 3 (00011) | | | | 1/2 | QPSK |
| 4 (00100) | 2 (0010<u>0</u>) | 1 (001<u>00</u>) | | 3/5 | QPSK |
| 5 (00101) | | | | 2/3 | QPSK |
| 6 (00110) | 3 (0011<u>0</u>) | | | 3/4 | QPSK |
| 7 (00111) | | | | 4/5 | QPSK |
| 8 (01000) | 4 (0100<u>0</u>) | 2 (010<u>00</u>) | 1 (01<u>000</u>) | 7/8 | QPSK |
| 9 (01001) | | | | 1/2 | 16-QAM |

TABLE 3-continued

| MCS set (CQI: 5 bits) | Subset 1 (CQI: 4 bits) | Subset 2 (CQI: 3 bits) | Subset 3 (CQI: 2 bits) | Coding rate | Modulation |
|---|---|---|---|---|---|
| 10 (01010) | 5 (01010) | | | 3/5 | 16-QAM |
| 11 (01011) | | | | 2/3 | 16-QAM |
| 12 (01100) | 6 (01100) | 3 (01100) | | 3/4 | 16-QAM |
| 13 (01101) | | | | 4/5 | 16-QAM |
| 14 (01110) | 7 (01110) | | | 5/6 | 16-QAM |
| 15 (01111) | | | | 7/8 | 16-QAM |
| 16 (10000) | 8 (10000) | 4 (10000) | 2 (10000) | 8/9 | 16-QAM |
| 17 (10001) | | | | 9/10 | 16-QAM |
| 18 (10010) | 9 (10010) | | | 10/11 | 16-QAM |
| 19 (10011) | | | | 11/12 | 16-QAM |
| 20 (10100) | 10 (10100) | 5 (10100) | | 1/2 | 64-QAM |
| 21 (10101) | | | | 3/5 | 64-QAM |
| 22 (10110) | 11 (10110) | | | 2/3 | 64-QAM |
| 23 (10111) | | | | 3/4 | 64-QAM |
| 24 (11000) | 12 (11000) | 6 (11000) | 3 (11000) | 4/5 | 64-QAM |
| 25 (11001) | | | | 5/6 | 64-QAM |
| 26 (11010) | 13 (11010) | | | 7/8 | 64-QAM |
| 27 (11011) | | | | 8/9 | 64-QAM |
| 28 (11100) | 14 (11100) | 7 (11100) | | 9/10 | 64-QAM |
| 29 (11101) | | | | 10/11 | 64-QAM |
| 30 (11110) | 15 (11110) | | | 11/12 | 64-QAM |
| 31 (11111) | | | | 1 | 64-QAM |

Table 3 illustrates a method for determining MCS subsets to include MCS levels having same one or more bit from the least significant bit and the other bits excluding the same one or more least significant bit from each of the MCS level indexes are used for MCS level indexes of the MCS subset and the other bits can be used for feedback information to an uplink channel form the mobile station.

Referring to subset 1 of Table 3, MCS subset is configured to include MCS levels that have same 1 bit from the least significant bit of MCS level index among MCS levels of MCS set and the other 4 bits from the most significant bit of MCS level index are used for MCS level index of the MCS subset. Therefore, it can be identified that a total of 16 MCS levels are included in the MCS subset, whereby 4 bits are only required for feedback information. If MCS level index is used for CQI, CQI can be represented as 4 bits as follows:

CQI index: XXXX0

This results in SNR granularity of 2 dB under the assumption of the transmission SNR range from −5 dB to 23 dB.

Likewise, referring to subset 2 of Table 3, MCS subset is configured to include MCS levels that have same 2 bits from the least significant bit of MCS level index among MCS levels of MCS set. Therefore, it can be identified that a total of 8 MCS levels are included in the MCS subset with SNR granularity of 4 dB, whereby 3 bits are only required for feedback information. If MCS level index is used for CQI, CQI can be represented as 3 bits as follows:

CQI index: XXX00

Likewise, referring to subset 3 of Table 3, MCS subset is configured to include MCS levels that have same 3 bits from the least significant bit of MCS level index among MCS levels of MCS set. Therefore, it can be identified that a total of 4 MCS levels are included in the MCS subset with SNR granularity of 8 dB, whereby 2 bits are only required for feedback information. If MCS level index is used for CQI, CQI can be represented as 2 bits as follows:

CQI index: XX000

Consequently, if the AMC scheme is used when rapid change of transmission SNR is required due to fast channel change, SNR granularity of the MCS subset becomes greater than that of the MCS set, thereby efficiently coping with channel change. Additionally, feedback information from the mobile station can be reduced from 5 bits to 4, 3 or 2 bits.

With using same MCS subset configuration method, it is sure that other MCS subsets can be generated. That is, MCS subset can be configured to include MCS levels that have same one or more bits from the least significant bit of MCS level index among MCS levels of MCS set wherein the same one or more bits is different with the case of the table 3.

For example, the subset 1 of Table 3 illustrates that MCS subset is configured to include MCS levels having '0' of the least significant bit of MCS level index. Of course, the MCS subset may be configured to include MCS levels having '1' of the least significant bit of MCS level index.

In the same way, a MCS subset may be configured to move out the least significant bits of MCS index.

Embodiment 2-3

Method for Configuring MCS Subset According to Service Type

In the method for configuring MCS subset according to this embodiment, MCS subset can be set per service channel. In other words, if all MCS levels in MCS set are not required depending on a service channel which the mobile station desires to use, MCS subset configured by some required MCS levels can be used. Thus, it is possible to reduce the amount of feedback information bits, improve performance, or lower transmission and reception complexity during data transmission and reception.

At this time, the type of the service can be identified by user request service information transmitted along with the aforementioned channel quality information through feedback information transmitted from the mobile station. Hereinafter, Table 4 illustrates an example of a method for configuring MCS subset in accordance with a type of a service in 5 bits MCS set.

TABLE 4

| (CQI: 5 bits) Service Type-1 | (CQI: 4 bits) Service Type-2 | (CQI: 3 bits) Service Type-3 | (CQI: 2 bits) Service Type-4 | Coding rate | Modulation |
|---|---|---|---|---|---|
| 0 (00000) | 0 (0000) | 0 (000) | | 1/5 | QPSK |
| 1 (00001) | | | | 1/4 | QPSK |
| 2 (00010) | 1 (0001) | | 0 (00) | 1/3 | QPSK |
| 3 (00011) | | | 1 (01) | 1/2 | QPSK |
| 4 (00100) | 2 (0010) | 1 (001) | | 3/5 | QPSK |
| 5 (00101) | | | 2 (10) | 2/3 | QPSK |
| 6 (00110) | 3 (0011) | | 3 (11) | 3/4 | QPSK |
| 7 (00111) | | | | 4/5 | QPSK |
| 8 (01000) | 4 (0100) | 2 (010) | | 7/8 | QPSK |
| 9 (01001) | | | | 1/2 | 16-QAM |
| 10 (01010) | 5 (0101) | | | 3/5 | 16-QAM |
| 11 (01011) | | | | 2/3 | 16-QAM |
| 12 (01100) | 6 (0110) | 3 (011) | | 3/4 | 16-QAM |
| 13 (01101) | | | | 4/5 | 16-QAM |
| 14 (01110) | 7 (0111) | | | 5/6 | 16-QAM |
| 15 (01111) | | | | 7/8 | 16-QAM |
| 16 (10000) | 8 (1000) | 4 (100) | | 8/9 | 16-QAM |
| 17 (10001) | | | | 9/10 | 16-QAM |
| 18 (10010) | 9 (1001) | | | 10/11 | 16-QAM |
| 19 (10011) | | | | 11/12 | 16-QAM |
| 20 (10100) | 10 (1010) | 5 (101) | | 1/2 | 64-QAM |
| 21 (10101) | | | | 3/5 | 64-QAM |
| 22 (10110) | 11 (1011) | | | 2/3 | 64-QAM |
| 23 (10111) | | | | 3/4 | 64-QAM |
| 24 (11000) | 12 (1100) | 6 (110) | | 4/5 | 64-QAM |
| 25 (11001) | | | | 5/6 | 64-QAM |
| 26 (11010) | 13 (1101) | | | 7/8 | 64-QAM |

TABLE 4-continued

| (CQI: 5 bits) Service Type-1 | (CQI: 4 bits) Service Type-2 | (CQI: 3 bits) Service Type-3 | (CQI: 2 bits) Service Type-4 | Coding rate | Modulation |
|---|---|---|---|---|---|
| 27 (11011) | | | | 8/9 | 64-QAM |
| 28 (11100) | 14 (1110) | 7 (111) | | 9/10 | 64-QAM |
| 29 (11101) | | | | 10/11 | 64-QAM |
| 30 (11110) | 15 (1111) | | | 11/12 | 64-QAM |
| 31 (11111) | | | | 1 | 64-QAM |

As illustrated in Table 4, a service type can be defined for one or more service channels, and MCS subset can be configured in accordance with the service type. Table 5 illustrates an example of a method for defining the service type.

TABLE 5

| Service Type | Kinds of Service |
|---|---|
| Service Type 1 | Unicast traffic for closed-loop |
| Service Type 2 | Unicast traffic for open-loop |
| Service Type 3 | Multicast traffic |
| Service Type 4 | Broadcast traffic |

In Table 5, service type 1 defines a closed-loop transmission and reception scheme of unicast traffic which transmits data to one mobile station, service type 2 defines an open-loop transmission and reception scheme of the unicast traffic. Service type 3 defines multicast traffic which allows a plurality of mobile stations to simultaneously receive data, and service type 4 defines broadcast traffic which allows all mobile stations to receive data.

In case of unicast traffic, if the AMC scheme is used by applying the MCS set which uses all MCS levels, it is expected that the best system efficiency can be obtained. Particularly, it is preferable that low-speed users and a closed-loop system which uses a scheme such as beam-forming and precoding can use the MCS set having great feedback overhead. Accordingly, as illustrated in Table 4, the 5 bits MCS set can be used for service type 1.

Also, in another case of unicast traffic, high-speed users and an open-loop system which uses a scheme such as diversity can use MCS subset having small feedback overhead, wherein the scheme does not require feedback information except for CQI. Accordingly, 4 bits MCS subset can be used for service type 2 as illustrated in Table 4.

However, in case of multicast traffic or broadcast traffic, which allows one or more mobile stations to receive data, MCS subset which configures a small number of MCS levels if possible is required to enable robust data transmission. Accordingly, 3 bits MCS subset and 2 bits MCS subset can respectively be used for service type 3 and service type 4 as illustrated in Table 4.

Embodiment 2-4

Method for Configuring MCS Subset According to Combining with Power Control

In the adaptive modulation and coding scheme in a mobile communication system according to this embodiment, if data are transmitted to the mobile station by applying selected MCS level, power control can be transmitted together.

It the MCS subset is used, it is possible to reduce feedback overhead and enable fast link adaptation due to coarse SNR granularity. The MCS subset is used in conjunction with power control in accordance with this embodiment, whereby a problem that may cause link, adaptation error may occur due to coarse SNR granularity can be solved. In other words, if MCS level corresponding to required transmission SNR cannot be selected as granularity of MCS subset which is currently used, due to rapid change of channel condition, granularity of power control can be supplemented.

For example, if SNR granularity is 8 dB in the current system. SNR granularity which is currently used may fail to reflect channel condition well due to rapid change of the channel. In this case, instead of the existing power control of 1 dB, power control granularity of 2 dB or greater can be used to solve the problem that may occur when MCS subset is used. Hereinafter. Table 6 illustrates an example of a method for configuring MCS set and MCS subset that can be used together with power control.

TABLE 6

| MCS set (CQI: 5 bits) | Subset 1 (CQI: 4 bits) | Subset 2 (CQI: 3 bits) | Scaling of Power Level [dB] | Coding rate | Modulation |
|---|---|---|---|---|---|
| 0 (00000) | 0 (0000) | 0 (000) | 0 | 1/5 | QPSK |
| 1 (00001) | | | -1 | 1/5 | QPSK |
| 2 (00010) | 1 (0001) | | 0 | 1/3 | QPSK |
| 3 (00011) | | | -1 | 1/3 | QPSK |
| 4 (00100) | 2 (0010) | 1 (001) | 0 | 3/5 | QPSK |
| 5 (00101) | | | -1 | 3/5 | QPSK |
| 6 (00110) | 3 (0011) | | 0 | 3/4 | QPSK |
| 7 (00111) | | | -1 | 3/4 | QPSK |
| 8 (01000) | 4 (0100) | 2 (010) | 0 | 7/8 | QPSK |
| 9 (01001) | | | -1 | 7/8 | QPSK |
| 10 (01010) | 5 (0101) | | 0 | 3/5 | 16-QAM |
| 11 (01011) | | | -1 | 3/5 | 16-QAM |
| 12 (01100) | 6 (0110) | 3 (011) | 0 | 3/4 | 16-QAM |
| 13 (01101) | | | -1 | 3/4 | 16-QAM |
| 14 (01110) | 7 (0111) | | 0 | 5/6 | 16-QAM |
| 15 (01111) | | | -1 | 5/6 | 16-QAM |
| 16 (10000) | 8 (1000) | 4 (100) | 0 | 8/9 | 16-QAM |
| 17 (10001) | | | -1 | 8/9 | 16-QAM |
| 18 (10010) | 9 (1001) | | 0 | 10/11 | 16-QAM |
| 19 (10011) | | | -1 | 10/11 | 16-QAM |
| 20 (10100) | 10 (1010) | 5 (101) | 0 | 1/2 | 64-QAM |
| 21 (10101) | | | -1 | 1/2 | 64-QAM |
| 22 (10110) | 11 (1011) | | 0 | 2/3 | 64-QAM |
| 23 (10111) | | | -1 | 2/3 | 64-QAM |
| 24 (11000) | 12 (1100) | 6 (110) | 0 | 4/5 | 64-QAM |
| 25 (11001) | | | -1 | 4/5 | 64-QAM |
| 26 (11010) | 13 (1101) | | 0 | 7/8 | 64-QAM |
| 27 (11011) | | | -1 | 7/8 | 64-QAM |
| 28 (11100) | 14 (1110) | 7 (111) | 0 | 9/10 | 64-QAM |
| 29 (11101) | | | -1 | 9/10 | 64-QAM |
| 30 (11110) | 15 (1111) | | 0 | 11/12 | 64-QAM |
| 31 (11111) | | | -1 | 11/12 | 64-QAM |

For example, if a power control factor of 0 dB or −1 dB is used while MCS subset having 2 dB SNR granularity, i.e., subset 1 of Table 5 is used, the MCS subset can be used to have the same SNR granularity as that of the MCS set which uses all MCS levels.

Embodiment 2-5

Method for Configuring MCS Subset According to Environment of Base Station

According to this embodiment, MCS subset can be configured depending on the environment of the base station, for example, the number of users per base station. For example, a base station having a large number of users in a multi-cell environment uses MCS subset while a base station having a small number of users can use MCS set.

In a multi-cell environment under an orthogonal frequency division multiple access (OFDMA) communication system, since load of feedback overhead is great in a base station where many users exist, if the MCS subset are used by the method of this embodiment, feedback information from the mobile station can be reduced.

Generally, a modulation scheme and a coding rate in managing the AMC scheme are determined by the base station in view of traffic management in a network or real time service support. Accordingly, in order to reduce feedback overhead of the mobile station, the base station can determine whether to use all MCS levels in MCS set depending on channel environment per user and user service type or some MCS levels by using the MCS subset. Also, if channel change is fast, greater SNR granularity can reflect the channel environment well while reducing feedback overhead.

Embodiment 2-6

Method for Configuring MCS Subset Irregularly

MCS subset may be selected irregularly without subjecting to a specific rule. In more detail, the MCS subset can be configured in such a manner that different SNR granularity is applied per SNR region of MCS set.

Alternatively, the MCS subset can be configured in such a manner that MCS levels having a low channel coding rate per modulation scheme (for example, QPSK, 16QAM, 64QAM) are selected for MCS subset in case of a channel having high frequency selectivity. If the MCS subset are configured by selecting the MCS levels having a low channel coding rate, frequency diversity gain can be maximized.

Hereinafter, Table 7 illustrates an example of a method for configuring MCS subset by applying different SNR granularity per SNR region of 5 bits MCS set.

TABLE 7

| (CQI: 5 bits) | (CQI: 4 bits) CQI type-1 | (CQI: 4 bits) CQI type-2 | (CQI: 4 bits) CQI type-3 | Coding rate | Modulation |
|---|---|---|---|---|---|
| 0 (00000) | 0 (0000) | 0 (0000) | 0 (0000) | 1/5 | QPSK |
| 1 (00001) | 1 (0001) | | | 1/4 | QPSK |
| 2 (00010) | 2 (0010) | | | 1/3 | QPSK |
| 3 (00011) | 3 (0011) | 1 (0001) | 1 (0001) | 1/2 | QPSK |
| 4 (00100) | 4 (0100) | | | 3/5 | QPSK |
| 5 (00101) | 5 (0101) | | | 2/3 | QPSK |
| 6 (00110) | 6 (0110) | 2 (0010) | 2 (0010) | 3/4 | QPSK |
| 7 (00111) | 7 (0111) | | | 4/5 | QPSK |
| 8 (01000) | 8 (1000) | | | 7/8 | QPSK |
| 9 (01001) | | 3 (0011) | 3 (0011) | 1/2 | 16-QAM |
| 10 (01010) | | | 4 (0100) | 3/5 | 16-QAM |
| 11 (01011) | 9 (1001) | | 5 (0101) | 2/3 | 16-QAM |
| 12 (01100) | | 4 (0100) | 6 (0110) | 3/4 | 16-QAM |
| 13 (01101) | | | 7 (0111) | 4/5 | 16-QAM |
| 14 (01110) | 10 (1010) | | 8 (1000) | 5/6 | 16-QAM |
| 15 (01111) | | 5 (0101) | 9 (1001) | 7/8 | 16-QAM |
| 16 (10000) | | | 10 (1010) | 8/9 | 16-QAM |
| 17 (10001) | 11 (1011) | | 11 (1011) | 9/10 | 16-QAM |
| 18 (10010) | | 6 (0110) | | 10/11 | 16-QAM |
| 19 (10011) | | | | 11/12 | 16-QAM |
| 20 (10100) | 12 (1100) | | 12 (1100) | 1/2 | 64-QAM |
| 21 (10101) | | 7 (0111) | | 3/5 | 64-QAM |
| 22 (10110) | | 8 (1000) | | 2/3 | 64-QAM |
| 23 (10111) | 13 (1101) | 9 (1001) | 13 (1101) | 3/4 | 64-QAM |
| 24 (11000) | | 10 (1010) | | 4/5 | 64-QAM |
| 25 (11001) | | 11 (1011) | | 5/6 | 64-QAM |
| 26 (11010) | 14 (1110) | 12 (1100) | 14 (1110) | 7/8 | 64-QAM |
| 27 (11011) | | 13 (1101) | | 8/9 | 64-QAM |
| 28 (11100) | | 14 (1110) | | 9/10 | 64-QAM |
| 29 (11101) | 15 (1111) | 15 (1111) | 15 (1111) | 10/11 | 64-QAM |
| 30 (11110) | | | | 11/12 | 64-QAM |
| 31 (11111) | | | | 1 | 64-QAM |

Table 7 illustrates the case where MCS subset is configured MCS levels in the MCS subset to have a small SNR granularity in a low SNR region in the 5 bits MCS set and to have a large SNR granularity in a high SNR region in the 5 bits MCS set, or its contrary case. Although all MCS subsets equally have 4 bits in Table 7, there is no limitation in size of MCS subset in the present invention, wherein the size may be small per MCS subset.

In other words, Table 7 illustrates a method of selecting each MCS subset by determining MCS levels at a fine SNR interval size in a low SNR region, a middle SNR region, or a high SNR region and determining the MCS levels at a coarse SNR interval size in the other SNR regions. If the aforementioned method for configuring subsets is used per CQI type, it is possible to reduce the feedback amount and prevent performance from being deteriorated. Hereinafter, Table 8 illustrates a method for defining each CQI type in accordance with positions of users in a multi-cell environment.

TABLE 8

| CQI type | Kind of user |
|---|---|
| CQI type-1 | In case of user located in a edge of a cell in a multi-cell environment (low geometry mobile station) |
| CQI Type-2 | In case of user located in a middle of a cell in a multi-cell environment (middle geometry mobile station) |
| CQI Type-3 | In case of user located adjacent to a base station in a multi-cell environment (high geometry mobile station) |

Generally, although the AMC scheme defines MCS levels at a value of an instantaneous channel status, it is difficult to change the SNR region in case of a mobile station having low moving speed. Accordingly, a small SNR interval is used in SNR region which is mainly used, and a great SNR interval is used in SNR region which is not mainly used. Also, the MCS subset can be changed at a long time period. In this case, it is possible to prevent performance from being deteriorated while reducing the feedback amount.

It will be apparent that the present invention can be applied to the case where MCS subset is configured by various methods in addition to the aforementioned method for configuring MCS subset.

Embodiment 3

Feedback Scheme for MCS Subset

In the method for performing an adaptive modulation and coding scheme in a mobile communication system according to this embodiment, if the MCS subset is used, the entire or some of uplink resources allocated for uplink feedback information can be used.

For example, if subset 2 of Table 3 is set as MCS subset, CQI can be expressed as 3 bits below.

CQI index: XXX00

In this case, uplink feedback information may be transmitted as 'XXX' of 3 bits, or 'XXX00' of 5 bits which is the same as that of MCS set.

This represents that maximum CQI bits can be used to have feedback overhead which is the same as that MCS subset are not used, even in case that the MCS subset are used. Even in case that feedback overhead can be reduced by using the MCS subset, the same feedback type is used to lower complexity of the feedback channel, wherein the MCS subset are configured to be used for data transmission and reception.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

As apparent from the above description, the present invention can be applied to a wireless access system, a wireless communication system, and a mobile communication system.

What is claimed:

1. A method for performing an adaptive modulation and coding (AMC) scheme in a mobile communication system, the method performed by a receiver and comprising:
   receiving MCS information from a transmitter, wherein a size of the MCS information is 5 bits;
   identifying a modulation and coding scheme (MCS) level from an MCS set according to the MCS information; and
   communicating with the transmitter using the MCS level,
   wherein the MCS set includes a MCS subset defined in accordance with a service type of the receiver,
   wherein the MCS subset is configured with one or more MCS levels having different modulation schemes, and
   wherein the MCS level is indicated by using four bits of the MCS information when the MCS level is selected from the MCS subset.

2. The method according to claim 1, wherein the MCS level represents a modulation scheme one of a quadrature phase shift keying QPSK, a 16 quadrature amplitude modulation QAM, and a 64 QAM.

3. The method according to claim 2, wherein the MCS subset is configured with MCS levels of the QPSK and the 16 QAM.

4. The method according to claim 2, wherein each of the MCS levels are mapped to different coding rates.

5. The method according to claim 2, the service type defines an open-loop transmission and reception scheme of unicast traffic.

6. The method according to claim 2, wherein a most significant bit of the MCS information is set to '0'.

7. The method according to claim 2, wherein the four bits of the MCS information is least significant bits of the MCS information.

8. A receiver for performing an adaptive modulation and coding (AMC) scheme in a mobile communication system, wherein the receiver is configured to:
   receive MCS information from a transmitter,
   identify a modulation and coding scheme (MCS) level from an MCS set according to the MCS information; and
   communicate with the transmitter using the MCS level, and
   wherein a size of the MCS information is 5 bits,
   the MCS set includes a MCS subset defined in accordance with a service type of the receiver,
   the MCS subset is configured with one or more MCS levels having different modulation schemes, and
   the MCS level is indicated by using four bits of the MCS information when the MCS level is selected from the MCS subset.

9. The receiver according to claim 8, wherein the MCS level represents a modulation scheme one of a quadrature phase shift keying QPSK, a 16 quadrature amplitude modulation QAM, and a 64 QAM.

10. The receiver according to claim 9, wherein the MCS subset is configured with MCS levels of the QPSK and the 16 QAM.

11. The receiver according to claim 9, wherein each of the MCS levels are mapped to different coding rates.

12. The receiver according to claim 9, the service type defines an open-loop transmission and reception scheme of unicast traffic.

13. The receiver according to claim 9, wherein a most significant bit of the MCS information is set to '0'.

14. The receiver according to claim 9, wherein the four bits of the MCS information is least significant bits of the MCS information.

\* \* \* \* \*